United States Patent [19]
Katz

[11] Patent Number: 5,128,984
[45] Date of Patent: Jul. 7, 1992

[54] TELEPHONE INTERFACE CALL PROCESSING SYSTEM WITH CALL SELECTIVITY

[75] Inventor: Ronald A. Katz, Los Angeles, Calif.

[73] Assignee: First Data Resources Inc., Omaha, Nebr.

[21] Appl. No.: 425,779

[22] Filed: Oct. 23, 1989

Related U.S. Application Data

[63] Continuation-in-part of Ser. No. 312,792, Feb. 21, 1989, Pat. No. 5,073,929, which is a continuation-in-part of Ser. No. 194,258, May 16, 1988, Pat. No. 4,845,739, which is a continuation-in-part of Ser. No. 18,244, Feb. 24, 1987, Pat. No. 4,792,968, which is a continuation-in-part of Ser. No. 753,299, Jul. 10, 1985, abandoned.

[51] Int. Cl.⁵ .................................... H04M 11/00
[52] U.S. Cl. ........................... 379/92; 379/97; 379/142; 379/95
[58] Field of Search ............ 379/92, 97, 207, 225, 379/127, 201, 211, 266, 265, 142, 95

[56] References Cited

U.S. PATENT DOCUMENTS

| 4,756,020 | 7/1988 | Fodale | 379/127 |
| 4,797,911 | 1/1989 | Szlam et al. | 379/92 |
| 4,922,522 | 5/1990 | Scanlon | 379/97 |

OTHER PUBLICATIONS

Int'l Pub. No. WO87/00375, Katz, "Statistical Analysis System for Use with Public Comm. Facility" Jan. 1987.

*Primary Examiner*—James L. Dwyer
*Assistant Examiner*—Stella L. Woo

[57] ABSTRACT

For use with a public telephone network CO incorporating a vast number of terminals T1-Tn, a system CS limits and controls interface access to implement voice-digital communication for statistical processing. The system CS accommodates calls in different modes, e.g. "800", "900" or area code and incorporates qualifying apparatus to restrict against caller misuse. Alternative calling modes are used to reach an interface facility that also affords some control based on calling terminal identification, e.g. as by ANI equipment.

23 Claims, 2 Drawing Sheets

5,128,984

TELEPHONE INTERFACE CALL PROCESSING SYSTEM WITH CALL SELECTIVITY

RELATED SUBJECT MATTER

This is a continuation-in-part of application Ser. No. 312,792 filed Feb. 21, 1989, and entitled "Voice-Data Telephonic Control System," now U.S. Pat. No. 5,073,929, which was a continuation-in-part of application Ser. No. 194,258 filed May 16, 1988, and entitled "Telephonic-Interface Statistical Analysis System", now U.S. Pat. No. 4,845,739, which was a continuation-in-part of application Ser. No. 018,244 filed Feb. 24, 1987, and entitled "Statistical Analysis System for Use with Public Communication Facility", now U.S. Pat. No. 4,792,968, which was a continuation-in-part of application Ser. No. 753,299 filed Jul. 10, 1985, and entitled "Statistical Analysis System For Use With Public Communication Facility", now abandoned.

BACKGROUND AND SUMMARY OF THE INVENTION

Recent years have seen a considerable growth in the use of telephonic communications. For example, in various applications, telecommunications applications have expanded to accommodate voice-digital interfaces between computer apparatus and callers at remote telephone terminals. For example, by actuating the push buttons at a remote telephone terminal, a caller controls a computer apparatus to provide various entertainment or information. In using such a system, a caller might telephone a financial service and selectively actuate the telephone key panel to receive information on specific stocks or bonds.

Digital interface systems also have been implemented to utilize digital signals provided independently of the caller's actions. For example, the so-called "ANI" telephone equipment provides digital signals indicating a caller's telephone number. Equipment designated "DNIS" is similarly available to indicate the called number. Thus, digital signals may be provided telephonically to a system associated with individual calling terminals as for identification or other use.

Telephonic games and contests are among the various applications that have been recognized for implementation with telephone interface systems. Such games and contests may be variously presented, as in cooperation with an advertising program for a product or in a lottery format. Generally with respect to such applications, various call modes might be utilized.

Essentially, three telephonic calling modes or services are in widespread use. Specifically, caller-charge or "900" service (including "976" calls) involves a charge to the caller for each call. The "900" calling mode is useful for implementing games and contests with telephone interface systems; however, certain problems are encountered. Specifically, certain telephone terminals, e.g. pay phones, do not accommodate "900" service. Also, with respect to certain forms of games and contests, it is important to offer members of the public an alternative "free" method of participation. In general, the system of the present invention may be employed to implement "900" calling modes while accommodating "free" participation with reasonable control.

Telephone calls may be accommodated without charge using "800" service or calling mode. Generally, the "800" calling mode accommodates free calls by callers in various areas to a particular station incurring the charges. In most applications, it is important to regulate the use of the "800" calling mode. Another calling mode is the traditional method of calling, involving area-code numbers which also includes calls placed within a given area code which do not usually involve a specific charge and usually do not require dialing the area code. One of the problems associated with using the area-code calling mode for interface systems is the vast number of calls. For example, even in association with an advertising campaign, inviting members of the general public to participate in a free contest or game by telephone may prompt an overwhelming response. Accordingly, a need exists for a practical system to control and limit calls to an interface service in the traditional free area-code number mode.

Another aspect of telephonic-interface contests involves zealous or obsessive participants. For example, in a quiz contest, a zealous person might call repeatedly, researching answers to given questions until ultimately a question is repeated. At that time, the caller is ready with an answer and has an unfair advantage in the contest. Thus, a need exists for control within the interface system.

In general, the system of the present invention involves a telephone call processing system for receiving calls from a multitude of terminals in different call modes and for processing calls, as to a game or contest format, with means to limit repeat-call advantages. In a disclosed form, the system implements three calling modes to facilitate various formats while accomplishing certain protection both with regard to the calling mode and contest formats.

BRIEF DESCRIPTION OF THE DRAWINGS

In the drawings, which constitute a part of this specification, exemplary embodiments exhibiting various objectives and features hereof are set forth, specifically.

DESCRIPTION OF THE ILLUSTRATIVE EMBODIMENT

As required, a detailed illustrative embodiment of the present invention is disclosed herein. However, telephone techniques, physical communication systems, data formats and operating structures in accordance with the present invention may be embodied in a wide variety of forms and modes, some of which may be quite different from those of the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Figure 1:
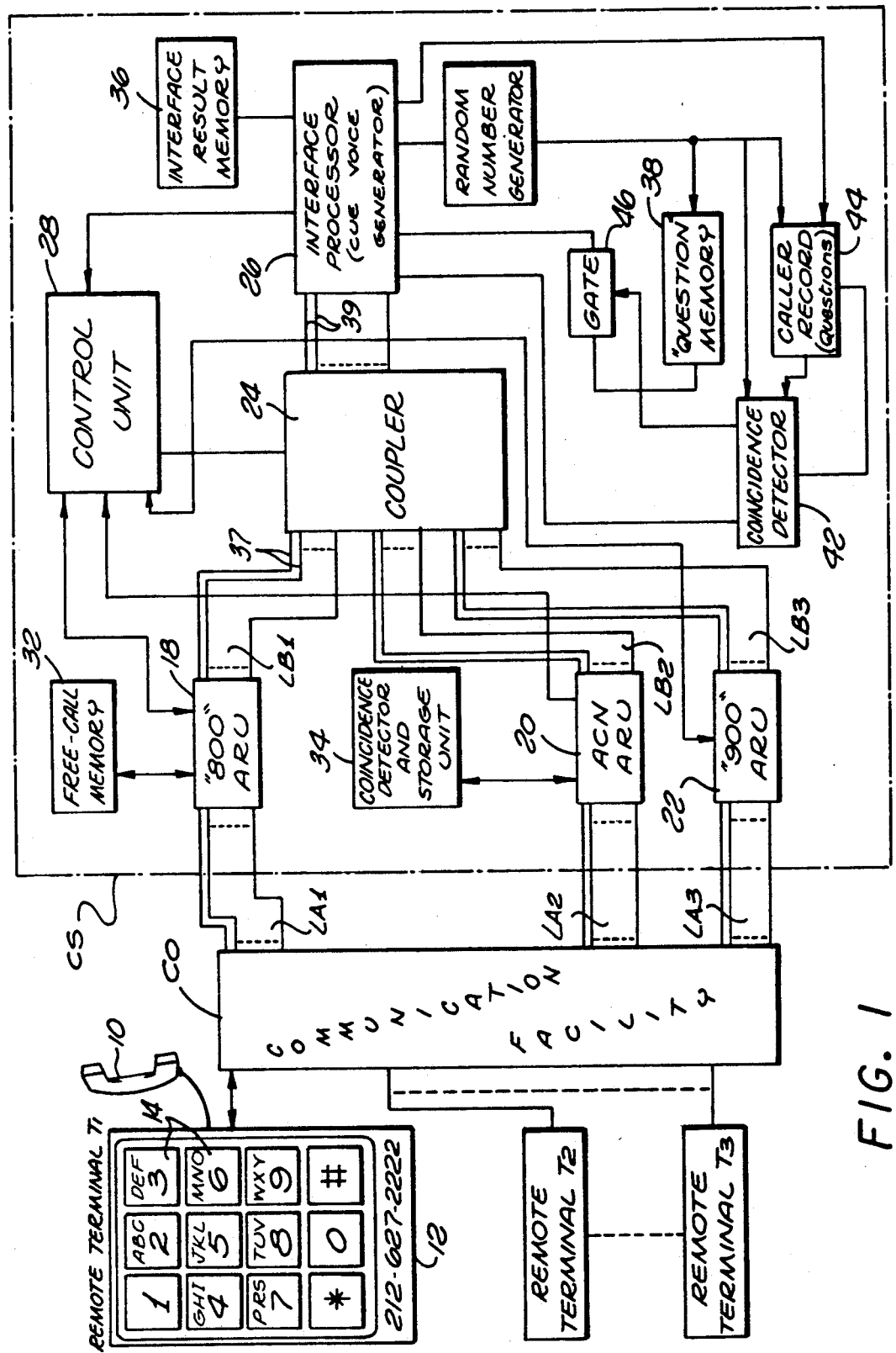
FIG. 1 is a block diagram of a system constructed in accordance with the present invention.

Referring initially to FIG. 1, a series of remote terminals T1-TN (telephone instruments) are represented (left). The terminals T1-TN may be functionally similar and accordingly only the terminal T1 is shown in any detail. The indicated terminals T1-TN represent the multitude of telephone terminals existing in association with a communication facility CO which may comprise a comprehensive public telephone network.

The communication facility CO, accommodating the individual terminals T1-TN, is coupled to a central processing station CS generally indicated within a dashed-line block. In the station CS, to illustrate operating aspects of the present invention, calls are selectively accepted and interfaced so as to accomplish a desired operating format, for example a contest or game.

Generally, calls from the individual terminals T1-TN might be in any of three modes, i.e. the "800" mode, the "900" mode or the area-code mode (traditional area code plus number or local number dialing). In the disclosed illustrative system, depending on individual calling modes, calls are selectively accepted for interface processing. Generally, the interface format accommodates "900" calls with supplemental "800" calls to accommodate both "free" access and all types of telephone terminals. In the disclosed embodiment, calls in the "800" mode are restricted in accordance with prearranged limitations. Furthermore, calls in the area-code mode (from all areas), the 800 mode and 900 mode may be limited to callers having a station number containing a predetermined digit sequence. For example, calls might be restricted to those from terminals having a telephone number ending in the digits "234".

The processing station CS also is controlled to limit the effectiveness of zealous callers. For example, in a contest format, callers may be quizzed with questions randomly drawn from an inventory. In accordance herewith, questions are not repeated to individual telephone terminals T1-TN. Thus, some control is imposed on an aggressive caller who might otherwise be given two opportunities to answer the same question.

Considering the system of FIG. 1 in greater detail, the exemplary telephone terminal T1 includes a handpiece 10 (microphone and earphone) and a panel 12 provided with a rectangular array of individual push buttons 14 in a conventional configuration. Of course, the handpiece 10 accommodates analog siganls while the panel 12 is a digital apparatus. During an interface operation, as disclosed in detail below, the caller is queued or prompted vocally through the handpiece 10 (earphone) to provide digital responses using the buttons 14.

At this stage, some specific aspects of the communication interface are noteworthy. Essentially, as a result of telephonic dialing at one of the terminals T1-TN, the communication facility CO couples the select terminal to an audio response unit. Specifically, to illustrate various aspects, three separate audio response units are provided in the station CS to accept calls in the three distinct modes. That is, an audio response unit 18 receives calls in the "800" mode. An audio response unit 20 receives calls in the area-code dialing mode, and an audio response unit 22 receives calls in the "900" dialing mode.

It will be understood that although three separate audio response units are illustrated, systems incorporating the principles of the present invention may well incorporate various numbers of audio response units for each calling mode, with each audio response unit having the capability to accommodate a substantial number of calls as indicated by the lines from the communication facility CO in FIG. 1. Alternatively, a single composite unit might be utilized. Also, the mode or aspects of the described embodiment might well be implemented singly or in various combinations. Herein, for purposes of explanation, calls are treated individually and processed accordingly through the three audio response units 18, 20 and 22.

Generally, the audio response units 18, 20 and 22 connect callers at remote terminals T1-TN from the communication facility CO through a coupler 24 (FIG. 1, station CS, center) to an interface processor 26. Both the coupler 24 and the processor 26 are connected to a control unit 28 that is also connected to the audio response units 18, 20 and 22. Accordingly, with overall supervision by the control unit 28, the audio response units 18, 20 and 22 answer and preliminarily qualify callers from the terminals T1-TN for connection through the coupler 24 to the interface processor 26.

Upon completion of an interface connection in the disclosed embodiment, a contest format is executed by vocally prompting callers to respond with digital data. At this point, it is noteworthy that the communication facility CO also provides identification signals to the audio response units 18, 20 and 22. Specifically, digital identification signals representing numbers associated with the calling terminals T1-TN are provided by "ANI" equipment independent of any action by the caller. In the event "ANI" equipment is not available, callers may be vocally prompted to provide the digital representations by selectively depressing the buttons 14.

The telephone communication facility CO also may provide digital signals indicating the called number. Generally, such a capability involves equipment designated "DNIS". The capability may be useful in various embodiments of the present system, as to distribute calls from a single equipment as mentioned above.

Pursuing the exemplary structure of FIG. 1 in still greater detail, the communication facility CO provides three sets of trunks or lines LA1, LA2 and LA3 respectively coupled to the audio response units 18, 20 and 22. From the audio response units 18, 20 and 22, sets of lines LB1, LB2 and LB3 are connected to the coupler 24. Under control of the control unit 28, the coupler 24 connects individual lines 37 of the sets LB1, LB2 and LB3 to the processor 26 through lines 39.

Generally, the audio response units 18, 20 and 22 may take the form of well known telephonic structures with the capability to "answer" calls and interface callers in a preliminary way. Each of the units 18, 20 and 22 incorporate a voice generator along with some basic programmable logic capability.

The audio response unit 18 is coupled to a free-call memory 32. Generally, the unit 18 in cooperation with the memory 32 operates with the control unit 28 to qualify acceptable calls in the "800" mode.

The audio response unit 20 is connected to a select-number coincidence detector 34. These structures along with the control unit 28 test area-code mode calls. The audio response unit 22 accepts calls without initial qualification.

The system of the disclosed embodiment selectively qualifies callers depending on their calling mode. Additionally, the system responds to caller identification to enhance contest equity. Generally, the interface processor 26 poses questions to calling contestants and stores the resulting answers in a result memory 36. Questions given to contestants are selected from a memory 38 by a random number generator 40. Essentially, the memory 38 contains an inventory of questions addressable by numbers provided by the random number generator 40. The address numbers from the generator 40 are also supplied to a coincidence detector 42 that also receives the address numerals of questions previously presented to a specific caller from a record 44. Thus, before a question is presented to a caller, the number of the calling terminal is checked to assure that the same question has not previously been posed to a caller at that terminal.

If the coincidence detector 42 clears the current question as not being repetitive, a gate 46 is qualified and the question is supplied from the memory 30 to the interface processor 26. A voice generator within the interface processor 26 then provides signals through a designated line 39, the coupler 24, a line 37, one of the audio response units and the communication facility CO to the connected remote terminal. As a result, the caller hears a simulated voice question. The answer is provided by the caller actuating the buttons 14 at the calling terminal. In that regard, the question may be in a multiple choice or true-false format to accommodate simple push button actions at the terminal.

In view of the above description of structural elements in the disclosed embodiment, a comprehensive understanding of the system may now best be accomplished by assuming certain operating conditions and describing the resulting operations. Accordingly, assume that the system CS is programmed to accommodate a relatively simple game format, that is, a sponsored contest for the promotion of a product, e.g. the XYZ Widget. Further assume the contest is of limited participation based either upon: the payment of a token fee ("900" calling mode), prearranged participation ("800" calling mode), lottery selection (area-code calling mode) or lottery selection in combination with either 800 or 900 calling modes. Considering exemplary possibilities of the format, the XYZ Widget might be advertised with an invitation to participate via the "900" calling mode. Alternatively, participants might be variously qualified as by select notification; however, in the exemplary format, such participants would incur a token charge imposed through "900" telephonic service. To consider an example, an offering might be stated: "If your last three phone digits are 972 you may call, 1) if you wish, call 1 900 XXXX972 ($0.95 service charge) provided your last three phone digits are 972; 2) if you have written in for a 'free to enter' you can use the one-time PIN number provided your last three phone digits are 972. In this case you can use the 'free' 800 number provided to you with your PIN number."

As indicated above, some telephone terminals do not accommodate "900" calling mode. Also, under certain circumstances, it is important to afford members of the public "free" access to participate in various games or contests. For example, such participation might be arranged by mail or other communication to provide a participant with a limited-use (i.e. one) qualification number. With use, the numbers are stored in the memory 32 and the list is checked subsequently to avoid repeat use.

A third class of contest participants might be considered lottery winners. For example, the sponsor might televise a drawing of three decimal digits to provide a sequence of three numbers. The three numbers might identify "winning" or "entitled" participants by corresponding to the last three numbers (digits) of their telephone number. For example, the drawing of the numbers "257" would entitle a single call participation from any of the telephone terminals T1-TN designated by a number, the last three digits of which are "257".

In an exemplary contest format, participants might be asked a few test questions (for minor prizes and the ability to participate in a lottery). Of course, a vast variety of possibilities exist; and in that regard, interim prizes may be awarded to participants as the format proceeds from the initial call to the ultimate prize. At the present point, it is important to appreciate that the system accommodates participants using various telephone call modes with select qualification to participate in an interface format utilizing voice prompt and pushbutton digital communication. In accordance with the described example, the sponsor invites participants to enter using "900" calling mode service. As a part of such an invitation, persons are advised that "free" entry or participation may be gained by sending a self-addressed envelope to receive an entry number, e.g. eight digits, for use via "800" calling mode service. In the disclosed embodiment, the eight-digit numeral is coded for verification. Of course, numerous possibilities exist. As a simple example the second and sixth digits of the number might have a specific sum, e.g. seven or seventeen. That is, the second and sixth digits might be: three and four, five and two, six and one, seven and zero, nine and eight and so on. A qualifying number would be: "34726313", the second and sixth digits being four and three, respectively.

With the arrangements completed for calling entries in the "900" and "800" mode, the contest might operate for several days before being opened to area-calling participants. That is, the area-calling mode might be available only after a televised drawing entitling participation from a select group of telephone numbers for a limited period of time.

Figure 2:
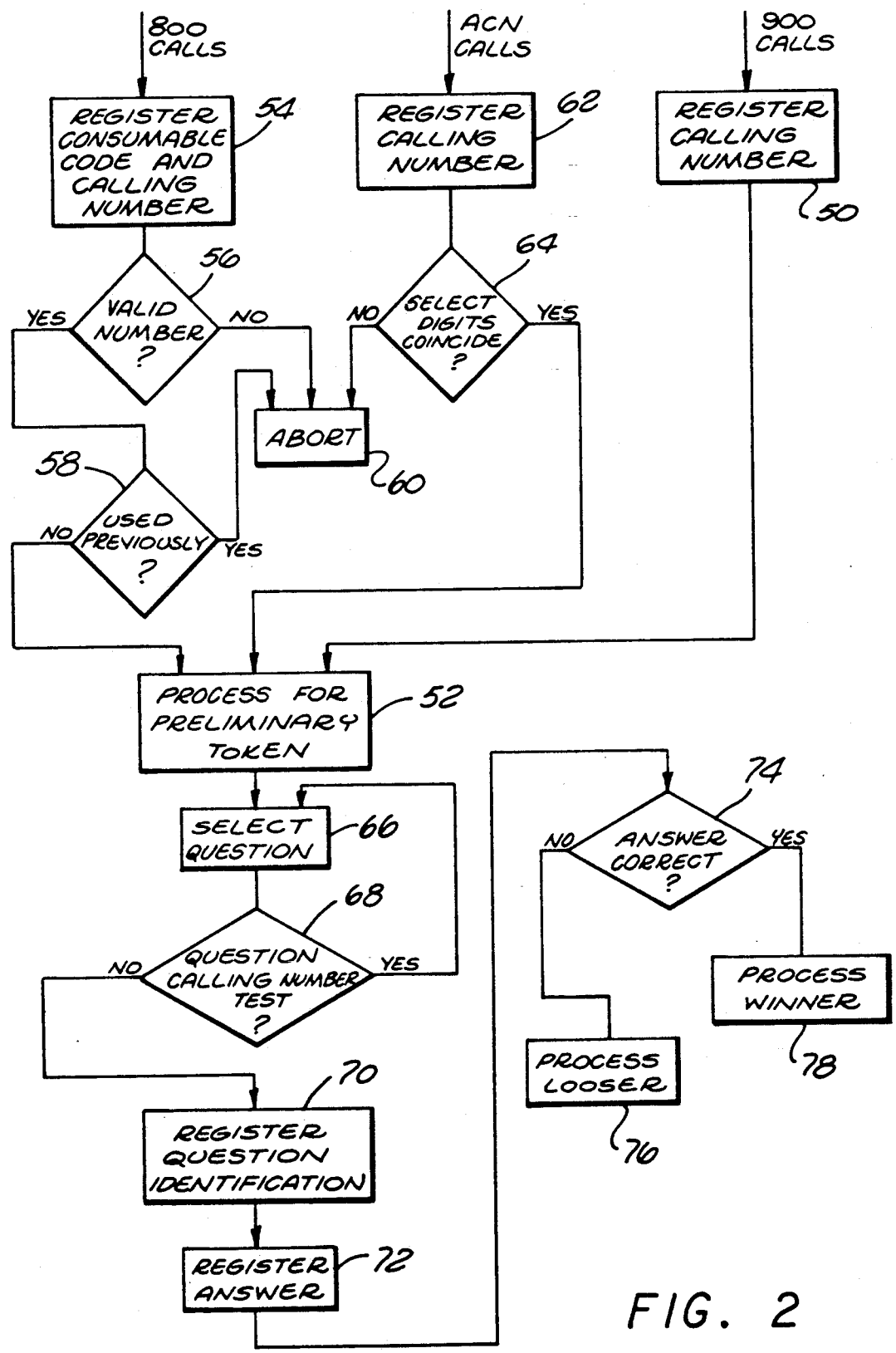
FIG. 2 is a flow diagram of an operating format of the system of FIG. 1.

In view of the above assumptions and descriptions, consider now the operation of the system as depicted in FIG. 1 in relation to the process diagram of FIG. 2. That is, assume the system of FIG. 1 is implemented and programmed to accommodate the exemplary operations as will now be described with reference to the process diagram of FIG. 2.

First, suppose a caller at the terminal T1 places a call in the "900" mode in response to an advertisement by a sponsor promoting XYZ Widgets. Perhaps the caller will receive at least a token gift and might qualify for a major lottery prize.

The assumed call involves the caller actuating the buttons 14 as for example to input: "1 900 5558945". As a result, signals are provided to the communication facility CO resulting in a connection from the remote terminal T1 to the audio response unit 22. With the connection, the communication system CO also provides the audio response unit 22 with digital identification signals representative of the designation for remote terminal T1 ("212 627 2222"). The identification signals are provided by the ANI equipment within the communication facility CO and are registered by the audio response unit 22. The operation is illustrated as a process step in FIG. 2 by the block 50 (upper right) for "900" mode calls.

As suggested above, it may be desirable for a format to provide a token award to all callers in the "900" mode. Recognizing such particulars as possibilities, in the disclosed embodiment, calls in the "900" mode are passed through the audio response unit 22 (FIG. 1) and the coupler 24 to the interface processor 26. Accordingly, the interface processor 26 receives the calling number and processes the contest format as described in detail below.

The initial step of the format common to all call modes is represented by the block 52 in FIG. 2. However, as calls in all modes are processed similarly from that point, before proceeding with the explanation, the preliminary operations attendant other calling modes first will be explained.

As explained above, certain accommodations are made for participation in the "800" (caller free) mode. Accordingly, assume a caller at the terminal T1 has been given an identification number: "34726313" for use in the "800" mode. Accordingly, the caller dials a number, e.g. "800 555 3478", actuating the terminal T1 and the communication facility CO to provide a connection with the audio response unit 18. With communication, the audio response unit actuates an internal voice generator prompting the caller to key in his assigned number, "34726313". As the digits of the number are keyed in by the caller, they are supplied from the audio response unit 18 to the control unit 28 and the free-call memory 32.

Within the control unit 28, logic is provided for verifying the identification number as proper. In accordance with the simple example explained above, the control unit 28 would simply sum the second and sixth digits to test for a total of "7". The coincidence test is represented by the query block 56 in FIG. 2. As indicated above, various codes and verification techniques are well known along with the apparatus for verifying assigned numbers.

If the control unit 28 validates the qualification number "34726313", it is recorded in the free-call memory 32 for future checking against repeat use. Accordingly, each call in the "800" mode also involves a check or test from the audio response unit 18 to the memory 32 to determine whether or not the assigned qualification number has been previously used. The previous-use test is illustrated as a process step by the query block 58 in FIG. 2.

If the control unit 28 determines the qualification number to be invalid or the memory 32 reveals the number has been previously used, the communication is aborted by the audio response unit 18. For example, the audio response unit 18 may be actuated to provide simulated audio signals carrying a message terminating the communication. For example, the caller might be advised: "The number you have provided is not valid. Consequently, your participation cannot be accepted on that basis."

If the entered number is valid and has not been previously used, the tests indicated by the query blocks 56 and 58 (FIG. 2) are positive and the process again proceeds to the common step as indicated by the block 52, e.g. as to receive a token gift.

As indicated above, a third possibility for contest participation involves calling in the area-code mode. While numerous format possibilities exist, as suggested above, access for callers in the area-code mode might be limited to a relatively short period of time. For example, a television program advertising the XYZ Widget might include a drawing to select the telephone terminals from which callers may participate for a period of twenty-four hours. As indicated above, the drawing might identify the last three digits of telephone numbers for the approved terminals.

Following a relatively short time (e.g. one day) during which area-code callers may enter the contest, the contest might be concluded with the ultimate winner or winners determined. In any event, assume the presence of a caller at the terminal T2 with an approved telephone number, i.e. "212 627 2257". Somewhat as explained above with respect to other calling modes, keying operations by the caller at the remote terminal T2 result in a connection through the communication system CO to the audio response unit 20. As previously, the communication facility CO provides digital signals to the audio response unit 20 indicating the calling number (ANI). Thus, the calling number is registered as indicated by the block 62 in FIG. 2. As previously, in the event ANI equipment is not operative to serve the remote terminal T2, then the caller may be asked to key in his telephone number for subsequent verification.

From the audio response unit 20, the caller's number is supplied to the coincidence detector and storage unit 34 for a two-stage test. A first test simply seeks a coincidence between the approved number sequence (three digits) and the last three digits of the calling number. In the example, the last three digits of the calling number ("257") are compared with the select digit sequence, "257". The test is indicated by the query block 64 in FIG. 2.

As a secondary test, the unit 34 may check a record of previous use. Thus, the unit 34 simply implements test logic to accomplish these comparison-step operations with structures as well known in the prior art.

If the tests are negative, as indicated by the query block 64, the communication is aborted as indicated by the block 60. Alternatively, a favorable test again directs the system to proceed to the step of block 52 at which the process enters a common phase for all calling modes.

With the entry of a call into the common phase, the line carrying the call is connected through the coupler 24 (FIG. 1) to the interface processor 26. That is, depending on the call mode, the call is passed through one of the audio response units 18, 20 or 22 and the coupler 24 to the interface processor 26. Note that as indicated above, each of the audio response units 18, 20 and 22 is capable of accommodating a large number of asynchronous calls. Similarly, the coupler 24 is capable of connecting lines from the audio response units 18, 20 and 22 (LB1, LB2 and LB3 respectively) to the interface processor on an individual basis through lines 37 and 39.

The interface processor 26 may comprise a relatively substantial computing capability for processing many individual calls with programmed variations. The processing operation is illustrated in FIG. 2 beginning with the block 52. However, note that as the interface processor 26 receives the telephone number identifying a calling terminal (ANI) reference may be made to a data bank. Therefore, the operation might involve reference to substantial data on a caller. Accordingly, a basis exists for several process variations accommodated by data from a bank. The block 52 represents such possibilities as well as further informing or processing callers.

With the receipt of a call at the interface processor 26, a voice generator may be actuated to specifically inform a caller, depending upon the specific format employed. Essentially, digital signals are provided to actuate a voice generator within the processor 26. Accordingly, an audio message is provided through the coupler 24, the associated audio response unit, and the communication facility CO to the connected remote terminal. Thus, the caller may be further informed or cued.

In the disclosed embodiment, concurrently with the operation of further informing the caller, the interface processor 26 actuates the random number generator 40 to provide a random address for the question memory 38. The process step is illustrated in FIG. 2 by the block 66.

The random number (identifying a question in the memory 38) is also provided to the coincidence detector 42 to test for the previous use of the question to the calling terminal. In that regard, the interface processor 26 provides the caller telephone number (ANI) to the caller record 44 which may simply take the form of a look-up table addressed by calling numbers and revealing the identification of previous questions propounded. The addresses of questions previously recorded for a calling number are supplied to the coincidence detector 42 for comparison with the current tentative question identification number. The process step is illustrated by the query block 68 in FIG. 2.

If the tentative question has been previously used for the calling terminal, a signal is provided from the coincidence detector 42 to the interface processor prompting a repeat operation by the random number generator 40 to select another question.

Alternatively, if the tentative question is not a repeat, then the coincidence detector 42 qualifies the gate 46 and the tentative question is supplied to the interface processor 26 for actual use. Note that upon the occurrence of an approved question, the coincidence detector also supplies a signal to the call record 44 which records the identification number of the question. The process step is illustrated in FIG. 2 by the block 70.

With the provision of signals representing a question through the gate 46 to the interface processor 26, the internal voice generator is actuated to propound the question to the caller. Recognizing the vast possibilities for contest formats, one or more rather difficult questions might be propounded to isolate lottery participants. Alternatively, a relatively easy question may be propounded as a minor obstacle to participation in the final phase of the contest. In any event, as prompted or cued, the caller responds using the buttons 14 and the response is registered for testing within the interface processor 26. The process steps are indicated by the block 72 and the query block 74 in FIG. 2. The results of the tests are then stored in the interface result memory 36. Note that in the interests of human perception, a printed record may be developed concurrently with the qualification of lottery participants.

Final processing to determine a winner or winners may involve any of various operations as a drawing, an event, and so on. Accordingly, as indicated by the blocks 76 and 78, final determinations are made of winners and losers with predetermined prize allocations. Thus, the system of the present invention enables effective regulation and control of interfaces between persons at telephone stations and a central processing apparatus. Calls in various modes are accommodated with appropriate tests, and interface data (e.g. test questions) are qualified.

In view of the above descriptions, it will be apparent that the disclosed embodiment is susceptible to considerable modification in the implementation of the present invention in conjunction with a telephone system to accommodate caller interface operations. Although the disclosed embodiment is directed to a contest, it will be apparent that aspects of the system may be variously embodied to accommodate any of a variety of telephone interface operations. Furthermore, it will be apparent that while the disclosed embodiment comprises specific elements and configurations, any of a variety of structures might well be utilized. Accordingly, the scope hereof is deemed to be as set forth in the claims below.

What is claimed is:

1. A telephone call processing system for receiving calls from a multitude of terminals in different call modes including an "800" call mode and a "900" call mode for processing to an interface format and involving digital signals associated with said terminals as for identification or data, said system comprising:
   first response unit means for receiving calls in said "800" call mode;
   qualification means for qualifying said calls in said "800" call mode received by said first response unit to provide qualified calls;
   second response unit means for receiving calls in a second call mode;
   means for processing calls in an interface format; and
   means for coupling said qualified calls and said calls in a second mode to said means for processing.

2. A system according to claim 1 wherein said second response unit is coupled to receive calls in said "900" call mode.

3. A system according to claim 2 wherein said qualification means comprises a test structure, for testing said digital signals associated with said terminals originating said calls in said "800" call mode.

4. A system according to claim 1 wherein said qualification means comprises means for testing said digital signals associated with said terminals originating said calls.

5. A system according to claim 4 further including a free-call memory structure tallying said digital signals associated with said "800" call mode and wherein said means for testing tests the content of said memory structure.

6. A system according to claim 5 wherein said second response unit is coupled to receive calls in said "900" call mode.

7. A system according to claim 5 wherein said qualification means comprises means for testing select digits of said digital signals associated with said terminals originating said calls in said 800 call mode.

8. A system according to claim 1 wherein said qualification means includes means for testing select digits of said digital signals associated with a calling terminal for identification.

9. A system according to claim 8 wherein said means for processing includes means for selecting interface questions for caller sand record means for recording selected interface questions in association with said digital signals for identification.

10. A telephone call processing system for receiving calls from a multitude of terminals for processing to an interface format and involving digital signals associated with said terminals as for identification or data, said system comprising:
   cue means for prompting question responses from said terminals in the form of digital signals as data;
   question selection means for selecting individual questions from a plurality of questions for actuating said cue means;
   call record memory means for storing identified questions cued to said terminals, addressable by said digital signals associated with said terminals for identification;
   test means for testing individual questions selected by said question selection means against questions from said call record memory means to detect coincidence; and control means coupled to said cue means, said selection means, said memory means and said test means, said control means for sequencing operations to select a question, test the selected question and either actuate said cue means or select another question under control of said test, said control means also including a gate structure for inhibiting the cue means in the event of selecting a question of record in said call record memory means.

11. A telephone call processing system according to claim 10 further including processing means for processing said digital signals as data.

12. A system according to claim 11 wherein said memory means stores the last three digits of numbers associated with acceptable terminals for identification and thereby controls said processing means based on acceptance of said calls.

13. A system according to claim 12 wherein at least three digits are tested based on ANI data received by said system.

14. A system according to claim 10 wherein the memory means further stores complete phone numbers in memory to prevent duplicate use.

15. A telephone interface system for individually interfacing callers at a multitude or remote terminals for voice-digital communication through a telephone communication facility, said system comprising:

communication means for establishing telephone communication with currently active callers at certain of said terminals through said telephone communication facility;

means for providing identification signals to said communication means indicative of said currently active callers, said means for providing identification signals comprising means for providing at least a portion of the digits associated with a remote terminal for identification;

memory means for storing caller cues and use indications for said caller cues in relation to said callers as identified by said identification signals;

cue means for receiving said caller cues to provide voice signals through said communication means to prompt responses from said currently active of said callers in the form of digital data signals; and means for selecting a current caller cue from said memory means for one of said currently active callers for application to said cue means under control of said identification signals for said one of said currently active callers and said use indications in said memory means for said one of said currently active callers.

16. A system according to claim 15 wherein said means for providing at least a portion of the digits includes means for receiving automatic number identification (ANI) signals.

17. A telephone interface system for individually interfacing callers at a multitude of remote terminals for voice-digital communication through a telephone communication facility, said system comprising:

communication means for establishing telephone communication with currently active callers at certain of said terminals through said telephone communication facility;

means for providing identification signals to said communication means indicative of said currently active callers;

memory means for storing caller cues and use indications for said caller cues in relation to said callers as identified by said identification signals;

cue means for receiving said caller cues to provide voice signals through said communication means to prompt responses from said currently active of said callers in the form of digital data signals; and means for selecting a current caller cue from said memory means for one of said currently active callers for application to said cue means under control of said identification signals for said one of said currently active callers and said use indications in said memory means for said one of said currently active callers, said means for selecting including means for addressing said memory means to provide a possible caller cue with use indications and coincidence means for testing said use indications for said possible caller cue against said identification signals for said one of said currently active callers.

18. A system according to claim 17 wherein said means to provide a possible caller cue includes a random number generator for addressing said memory means.

19. A telephone interface system for individually interfacing callers at a multitude of remote terminals for voice-digital communication through a telephone communication facility, said system comprising:

communication means for establishing telephone communication with currently active callers at certain of said terminals through said telephone communication facility;

means for providing identification signals to said communication means indicative of said currently active callers;

memory means for storing caller cues and use indications for said caller cues in relation to said callers as identified by said identification signals;

cue means for receiving said caller cues to provide voice signals through said communication means to prompt responses from said currently active of said callers in the form of digital data signals; and means for selecting a current caller cue from said memory means for one of said currently active callers for application to said cue means under control of said identification signals for said one of said currently active callers and said use indications in said memory means for said one of said currently active callers, said means for selecting including means to reject a caller cue indicated to have been used for a currently active caller.

20. A telephone interface system for individually interfacing callers at a multitude of remote terminals for voice-digital communication through a telephone communication facility, said communication facility providing number identification (ANI) signals indicative of the number for a calling remote terminal, said system comprising:

preliminary communication means for establishing preliminary telephone communication with callers at said terminals to receive said number identification (ANI) signals;

memory means for storing at least one predetermined sequence of select digits representative of only a portion of at least one of the numbers for identifying remote terminals means for testing said predetermined sequence of select digits against a select portion of a number for a calling terminal as represented by said number identification (ANI) signals for a current caller to provide a control signal; and means for accepting calls for interface communication beyond said preliminary telephone communication from said terminals in accordance with said control signal.

21. A telephone interface system according to claim 20 wherein said preliminary communication means comprises an audio response unit.

22. A telephone interface system according to claim 20 wherein said preliminary communication means comprises a response unit for receiving "800" mode calls.

23. A telephone call processing system for receiving calls from a multitude of terminals for processing in a lottery interface format wherein callers are cued by synthesized voice signals supplied to said terminals and respond with digital signals, as by actuating push buttons at said terminals, said system comprising:

means for selectively receiving calls from said multitude of terminals to establish telephone communication with a select subset of callers, said means for selectively receiving calls comprising means for receiving calls in a plurality of calls modes including an "800" calling mode;

means for providing identification signals for said callers of said select subset;

means for individually cuing said callers of said select subset to promote digital signals for processing to isolate a sub-subset of said callers; and means for storing identification signals for said callers of said sub-subset.

* * * * *

UNITED STATES PATENT AND TRADEMARK OFFICE
CERTIFICATE OF CORRECTION

PATENT NO. : 5,128,984

DATED : July 7, 1992

INVENTOR(S) : Ronald A. Katz

It is certified that error appears in the above-identified patent and that said Letters Patent is hereby corrected as shown below:

```
Column 3, line 39, delete "siganls", add ---signals---.
Column 10, line 50, delete "sand", add ---and--- .
Column 14, line 13, delete "promote", add ---prompt---.
```

Signed and Sealed this

Ninth Day of November, 1993

Attest:

BRUCE LEHMAN

*Attesting Officer*     *Commissioner of Patents and Trademarks*

(12) EX PARTE REEXAMINATION CERTIFICATE (9864th)
United States Patent
Katz

(10) Number: US 5,128,984 C1
(45) Certificate Issued: Oct. 8, 2013

(54) TELEPHONE INTERFACE CALL PROCESSING SYSTEM WITH CALL SELECTIVITY

(75) Inventor: Ronald A. Katz, Los Angeles, CA (US)

(73) Assignee: General Electric Capital Corporation, Atlanta, GA (US)

Reexamination Request:
No. 90/008,325, Nov. 13, 2006

Reexamination Certificate for:
Patent No.: 5,128,984
Issued: Jul. 7, 1992
Appl. No.: 07/425,779
Filed: Oct. 23, 1989

Certificate of Correction issued Nov. 9, 1993

Related U.S. Application Data

(63) Continuation-in-part of application No. 07/312,792, filed on Feb. 21, 1989, now Pat. No. 5,073,929, which is a continuation-in-part of application No. 07/194,258, filed on May 16, 1998, now Pat. No. 4,845,739, which is a continuation-in-part of application No. 07/018,244, filed on Feb. 24, 1987, now Pat. No. 4,792,968, which is a continuation-in-part of application No. 06/753,299, filed on Jul. 10, 1985, now abandoned.

(51) Int. Cl.
| | |
|---|---|
| *H04M 3/487* | (2006.01) |
| *A63F 3/08* | (2006.01) |
| *G07C 11/00* | (2006.01) |
| *G07C 15/00* | (2006.01) |
| *H04M 3/36* | (2006.01) |
| *H04M 3/38* | (2006.01) |
| *H04M 3/436* | (2006.01) |
| *H04M 3/46* | (2006.01) |
| *H04M 3/493* | (2006.01) |
| *H04M 3/51* | (2006.01) |
| *H04M 11/00* | (2006.01) |
| *H04Q 3/00* | (2006.01) |
| *H04Q 3/545* | (2006.01) |
| *H04Q 3/66* | (2006.01) |
| *H04Q 3/72* | (2006.01) |
| *H04Q 3/74* | (2006.01) |
| *H04M 3/42* | (2006.01) |
| *H04Q 3/64* | (2006.01) |
| *H04M 3/50* | (2006.01) |

(52) U.S. Cl.
USPC .................... 379/92.03; 379/88.2; 379/88.25; 379/93.13; 379/245

(58) Field of Classification Search
None
See application file for complete search history.

(56) References Cited

To view the complete listing of prior art documents cited during the proceeding for Reexamination Control Number 90/008,325, please refer to the USPTO's public Patent Application Information Retrieval (PAIR) system under the Display References tab.

*Primary Examiner* — Erik Kielin

(57) ABSTRACT

For use with a public telephone network CO incorporating a vast number of terminals T1-Tn, a system CS limits and controls interface access to implement voice-digital communication for statistical processing. The system CS accommodates calls in different modes, e.g. "800", "900" or area code and incorporates qualifying apparatus to restrict against caller misuse. Alternative calling modes are used to reach an interface facility that also affords some control based on calling terminal identification, e.g. as by ANI equipment.

At the time of issuance and publication of this certificate, the patent remains subject to pending reexamination control number 90/012,679 filed Sep. 15, 2012. The claim content of the patent may be subsequently revised if a reexamination certificate issues from the reexamination proceeding.

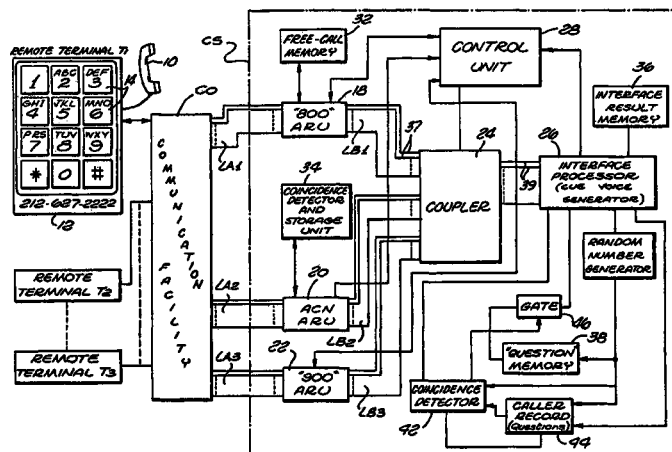

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1 and 4 are cancelled.

Claims 2, 3 and 5-23 were not reexamined.

* * * * *

(12) EX PARTE REEXAMINATION CERTIFICATE (10102nd)
United States Patent
Katz

(10) Number: US 5,128,984 C2
(45) Certificate Issued: Apr. 8, 2014

(54) TELEPHONE INTERFACE CALL PROCESSING SYSTEM WITH CALL SELECTIVITY

(75) Inventor: Ronald A. Katz, Los Angeles, CA (US)

(73) Assignee: General Electric Capital Corporation, Atlanta, GA (US)

Reexamination Request:
No. 90/012,679, Sep. 15, 2012

Reexamination Certificate for:
Patent No.: 5,128,984
Issued: Jul. 7, 1992
Appl. No.: 07/425,779
Filed: Oct. 23, 1989

Reexamination Certificate C1 5,128,984 issued Oct. 8, 2013

Certificate of Correction issued Nov. 9, 1993

Related U.S. Application Data

(63) Continuation-in-part of application No. 07/312,792, filed on Feb. 21, 1989, now Pat. No. 5,073,929, which is a continuation-in-part of application No. 07/194,258, filed on May 16, 1988, now Pat. No. 4,845,739, which is a continuation-in-part of application No. 07/018,244, filed on Feb. 24, 1987, now Pat. No. 4,792,968, which is a continuation-in-part of application No. 06/753,299, filed on Jul. 10, 1985, now abandoned.

(51) Int. Cl.
| | |
|---|---|
| *G07C 15/00* | (2006.01) |
| *G07C 11/00* | (2006.01) |
| *H04M 11/00* | (2006.01) |
| *H04Q 3/00* | (2006.01) |
| *H04Q 3/74* | (2006.01) |
| *H04Q 3/66* | (2006.01) |
| *H04M 3/493* | (2006.01) |
| *H04M 3/50* | (2006.01) |
| *H04M 3/487* | (2006.01) |
| *H04M 3/38* | (2006.01) |
| *H04M 3/51* | (2006.01) |
| *H04Q 3/72* | (2006.01) |
| *H04Q 3/545* | (2006.01) |
| *H04M 3/46* | (2006.01) |
| *H04M 3/36* | (2006.01) |
| *H04Q 3/64* | (2006.01) |
| *A63F 3/08* | (2006.01) |
| *H04M 3/436* | (2006.01) |
| *H04M 3/42* | (2006.01) |

(52) U.S. Cl.
USPC .... 379/92.03; 379/245; 379/88.2; 379/88.25; 379/93.13

(58) Field of Classification Search
None
See application file for complete search history.

(56) References Cited

To view the complete listing of prior art documents cited during the proceeding for Reexamination Control Number 90/012,679, please refer to the USPTO's public Patent Application Information Retrieval (PAIR) system under the Display References tab.

*Primary Examiner* — James Menefee

(57) ABSTRACT

For use with a public telephone network CO incorporating a vast number of terminals T1-Tn, a system CS limits and controls interface access to implement voice-digital communication for statistical processing. The system CS accommodates calls in different modes, e.g. "800", "900" or area code and incorporates qualifying apparatus to restrict against caller misuse. Alternative calling modes are used to reach an interface facility that also affords some control based on calling terminal identification, e.g. as by ANI equipment.

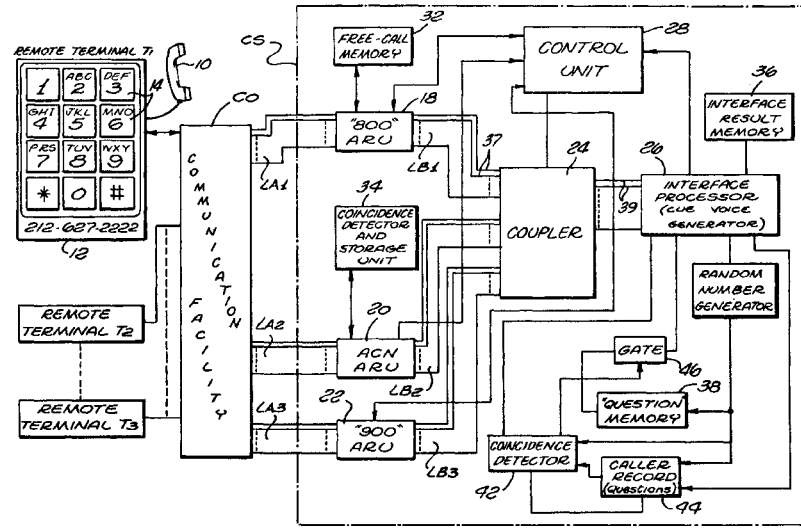

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 15 and 16 is confirmed.
Claims 1 and 4 were previously cancelled.
Claims 2, 3, 5-14 and 17-23 were not reexamined.

* * * * *